US012486836B2

(12) United States Patent
Van Cleempoel et al.

(10) Patent No.: US 12,486,836 B2
(45) Date of Patent: Dec. 2, 2025

(54) DEVICE FOR COMPRESSING A GAS AND METHOD OF ASSEMBLING SUCH DEVICE

(71) Applicant: ATLAS COPCO AIRPOWER, NAAMLOZE VENNOOTSCHAP, Wilrijk (BE)

(72) Inventors: Glenn Van Cleempoel, Wilrijk (BE); Kristof De Busschere, Wilrijk (BE); Steven De Man, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 18/841,815

(22) PCT Filed: Jan. 31, 2023

(86) PCT No.: PCT/IB2023/050834
§ 371 (c)(1),
(2) Date: Aug. 27, 2024

(87) PCT Pub. No.: WO2023/166362
PCT Pub. Date: Sep. 7, 2023

(65) Prior Publication Data
US 2025/0215870 A1 Jul. 3, 2025

(30) Foreign Application Priority Data
Mar. 3, 2022 (BE) .................................. 2022/5148

(51) Int. Cl.
*F04B 41/06* (2006.01)
*F04B 35/01* (2006.01)
(Continued)

(52) U.S. Cl.
CPC .............. *F04B 41/06* (2013.01); *F04B 35/01* (2013.01); *F04B 39/0284* (2013.01); *F04B 39/06* (2013.01)

(58) Field of Classification Search
CPC ...... F04B 41/06; F04B 35/01; F04B 39/0284; F04B 39/06
See application file for complete search history.

(56) References Cited

U.S. PATENT DOCUMENTS 9,518,505 B2 * 12/2016 Matthews ............. F02B 39/005
10,348,162 B1 * 7/2019 Huang ....................... F02C 7/12
(Continued)

FOREIGN PATENT DOCUMENTS

CN 106089659 A * 11/2016 ............. F04C 29/04
JP 2009-68496 A 4/2009
(Continued)

OTHER PUBLICATIONS

English Translation CN-106089659-A (Year: 2016).*
(Continued)

*Primary Examiner* — Shafiq Mian
(74) *Attorney, Agent, or Firm* — Sughrue Mion, PLLC

(57) ABSTRACT

A device for compressing a gas, including a first (3a) and second element (3b), wherein the device (1) includes a cooler (8) for the compressed gas and an oil reservoir (6a, 6b) for each of the elements, wherein a separate drive (4a, 4b) is provided for each element, wherein each element and the corresponding drive (4a, 4b) are arranged one behind the other, wherein the axial directions (X-X', Y-Y') of both elements extend parallel to each other, wherein, when the device (1) is arranged on a base (7); each oil reservoir (6a, 6b) is located between the drives (4a, 4b) and the base (7); and the cooler (8) is located between the elements and the base (7), wherein the cooler (8) is located (7) adjacent to the (Continued)

oil reservoirs (6*a*, 6*b*) and extends with its axial direction (Z-Z') transverse to the axial direction (X-X', Y-Y').

17 Claims, 4 Drawing Sheets

(51) Int. Cl.
*F04B 39/02* (2006.01)
*F04B 39/06* (2006.01)

(56) References Cited

U.S. PATENT DOCUMENTS

| | | | |
|---|---|---|---|
| 2006/0054146 A1* | 3/2006 | Ozawa | F02B 39/005 123/559.1 |
| 2018/0026504 A1* | 1/2018 | Huang | H02K 9/20 310/54 |
| 2018/0342919 A1* | 11/2018 | Huang | H02K 3/22 |

FOREIGN PATENT DOCUMENTS

| | | | |
|---|---|---|---|
| JP | 2009068496 A | * | 4/2009 |
| JP | 5746077 B2 | * | 7/2015 |

OTHER PUBLICATIONS

English Translation JP-2009068496-A (Year: 2009).*
English Translation JP-5746077-B2 (Year: 2015).*
International Search Report for International Application No. PCT/IB2023/050834 dated Feb. 24, 2023.
Written Opinion of the International Searching Authority for International Application No. PCT/IB2023/050834 dated Feb. 24, 2023.

* cited by examiner

DEVICE FOR COMPRESSING A GAS AND METHOD OF ASSEMBLING SUCH DEVICE

CROSS REFERENCE TO RELATED APPLICATIONS

This application is a National Stage of International Application No. PCT/IB2023/050834 filed Jan. 31, 2023, claiming priority based on Belgian Patent Application No. BE2022/5148, filed Mar. 3, 2022.

BACKGROUND OF THE INVENTION

Field

The present invention relates to a device for compressing a gas.

More specifically, the invention relates to a device having a first element for compressing the gas and a second element for compressing the gas.

Background

In the context of the present invention, 'a device for compressing a gas' can be understood to mean a compressor device, as well as a blower device, as well as a vacuum pump device.

Accordingly, 'an element for compressing the gas' in the context of the present invention can be understood to mean a compressor element, as well as a blower element, as well as a vacuum pump element.

Traditionally, such a compressor device is provided with one common drive for both compressor elements.

Furthermore, the compressor device also comprises one or more coolers for cooling the gas compressed by the compressor elements and oil reservoirs containing oil for lubricating gears and bearings of the compressor device.

Such known compressor devices have the disadvantage that the footprint, i.e. the surface area or the space occupied by the compressor device, is large and in many cases too large for certain applications.

In any case, it is almost always advantageous to realize the smallest possible footprint.

An additional disadvantage is that the known compressor devices do not allow a simple exchange between a water-cooled cooler and an air-cooled cooler. This means: when an exchange between a water-cooled and air-cooled cooler is necessary, the entire device needs to be converted.

The present invention aims to provide a solution to at least one of the aforementioned and other disadvantages.

SUMMARY OF THE INVENTION

The object of the present invention is an device for compressing a gas, comprising a first element for compressing the gas and a second element for compressing the gas, wherein the device is further provided with a drive for the elements, a cooler for the compressed gas and an oil reservoir for each of the elements, namely a first oil reservoir for the first element and a second oil reservoir for the second element, characterized in that a separate drive is provided for each element, namely a first drive for the first element and a second drive for the second element, wherein each element and the corresponding drive, viewed in an axial direction of this element, are arranged one behind the other, wherein the axial directions of both elements extend parallel to and spaced apart from each other and such that the elements and the drives are adjacent to one other, wherein, when the device is arranged on a base:

each oil reservoir is located between one or more of the drives or elements, on the one hand, and the base, on the other hand; and said cooler is located between one or more of the elements or drives, on the one hand, and the base, on the other hand;

wherein the cooler is located adjacent to the oil reservoirs relative to the base and extends with its axial direction transverse to the axial direction of the elements.

An advantage is that a modular device is obtained by providing separate drives.

After all, each pressure stage has its own shaft or line consisting of a drive and an element and its own oil reservoir.

If a transmission is present, it will be included in said shaft or line, between the relevant element and the corresponding drive.

This modularity offers many advantages in terms of design of the device, whereby the exchange of a pressure stage with another pressure stage can easily take place.

It will also be possible to switch between an air-cooled cooler and a water-cooled cooler, without having to adjust the remainder of the device.

Moreover, another advantage of the specific construction is that the device will have a very compact footprint.

After all, by keeping the cooler out of this modularity, the compactness of the device is not compromised, since the specific construction, as described above, is possible.

In other words: the invention allows a modularity to be carried out as far as possible, without sacrificing the compactness of the device.

Because the oil reservoirs and cooler can be used to support the drives and elements, the device becomes less voluminous.

This is partly the result of and possible by providing separate drives and by not providing separate coolers, or in other words: by not integrating the coolers into said modularity.

Yet another advantage consists in that, although the device is very compact, most parts of this device are easily accessible due to this specific setup.

This will facilitate maintenance and repair.

Said compressor elements can be flowed through by the gas in parallel, as well as be flowed through by the gas in series. In the latter case, a two-stage device is realized, wherein the first element forms the low-pressure stage element and the second element the high-pressure stage element.

In the latter case, the cooler preferably comprises an intercooler and an aftercooler.

Herein, both coolers will extend with their axial direction transverse to the axial direction of the compressor elements. One or both coolers will have a supporting function for the drives and the elements.

However, according to the invention the aftercooler is not necessary and in this case the cooler can only comprise an intercooler.

An additional advantage of the two separate oil reservoirs is that a failure of one of the modules or stages, causing contamination of the oil, will not cause pollution or problems in the other module or stage.

The invention also relates to a method of assembling a device for compressing a gas, which method comprises the following steps:

providing a first element for compressing the gas and a second element for compressing the gas;
providing a drive for the elements;
providing a cooler for the compressed gas;
providing an oil reservoir for each of the elements, namely a first oil reservoir for the first element and a second oil reservoir for the second element,
characterized in that the method further comprises the following steps:
providing a separate drive for each element, namely a first drive for the first element and a second drive for the second element;
placing each element and the corresponding drive one behind the other, viewed in an axial direction of this element, wherein the axial directions of both elements extend parallel to and spaced apart from each other and such that the elements and the drives are adjacent to each other;
placing the device on a base, whereby each oil reservoir is arranged between one or more of the drives or elements, on the one hand, and the base, on the other hand; wherein said cooler is arranged between one or more of the elements or drives, on the one hand, and the base, on the other hand; and wherein the cooler is arranged adjacent to the oil reservoirs with respect to the base, wherein the cooler extends with its axial direction transverse to the axial direction of the elements.

BRIEF DESCRIPTION OF THE DRAWINGS

With the aim of better demonstrating the features of the invention, some preferred embodiments of a device and method according to the invention are described below, by way of example without any limiting character, with reference to the accompanying drawings, in which.

DETAILED DESCRIPTION OF THE INVENTION

Figure 1:
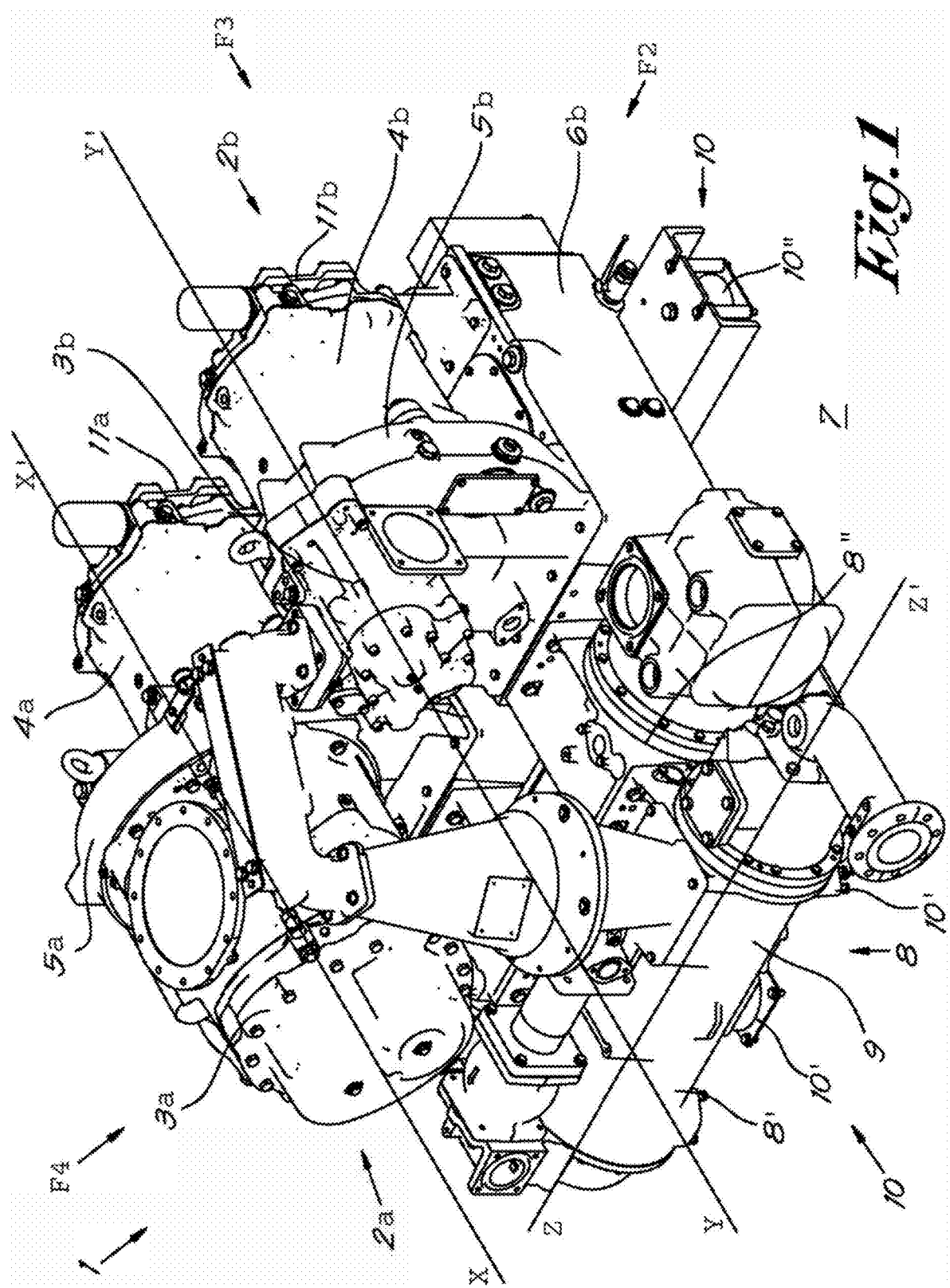
FIG. 1 shows schematically and in perspective a two-stage compressor device according to the invention.
Figure 2:
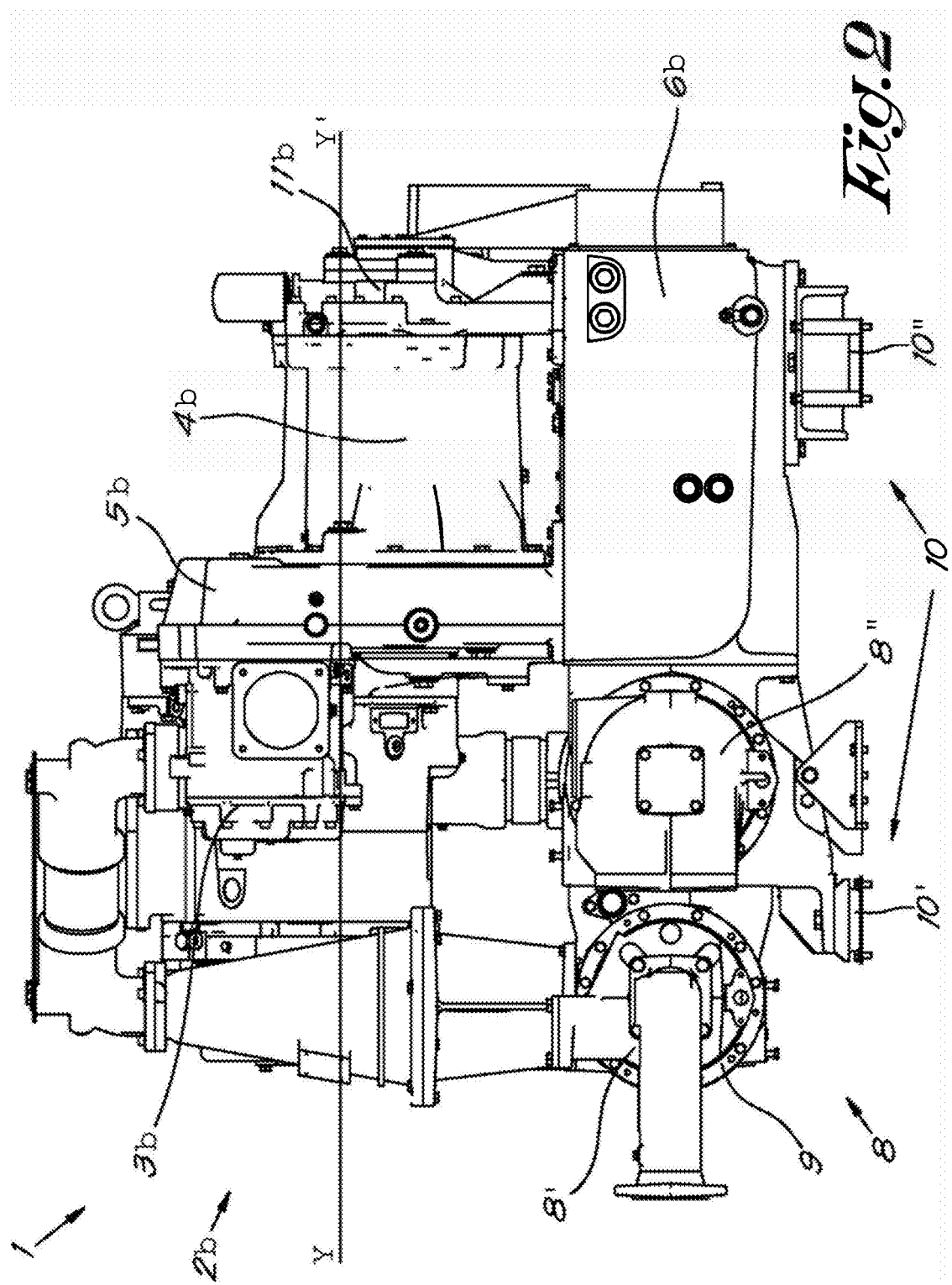
FIGS. 2 to 4 show a number of side views of the two-stage compressor arrangement of FIG. 1 according to the arrows F2, F3 and F4.
Figure 3:
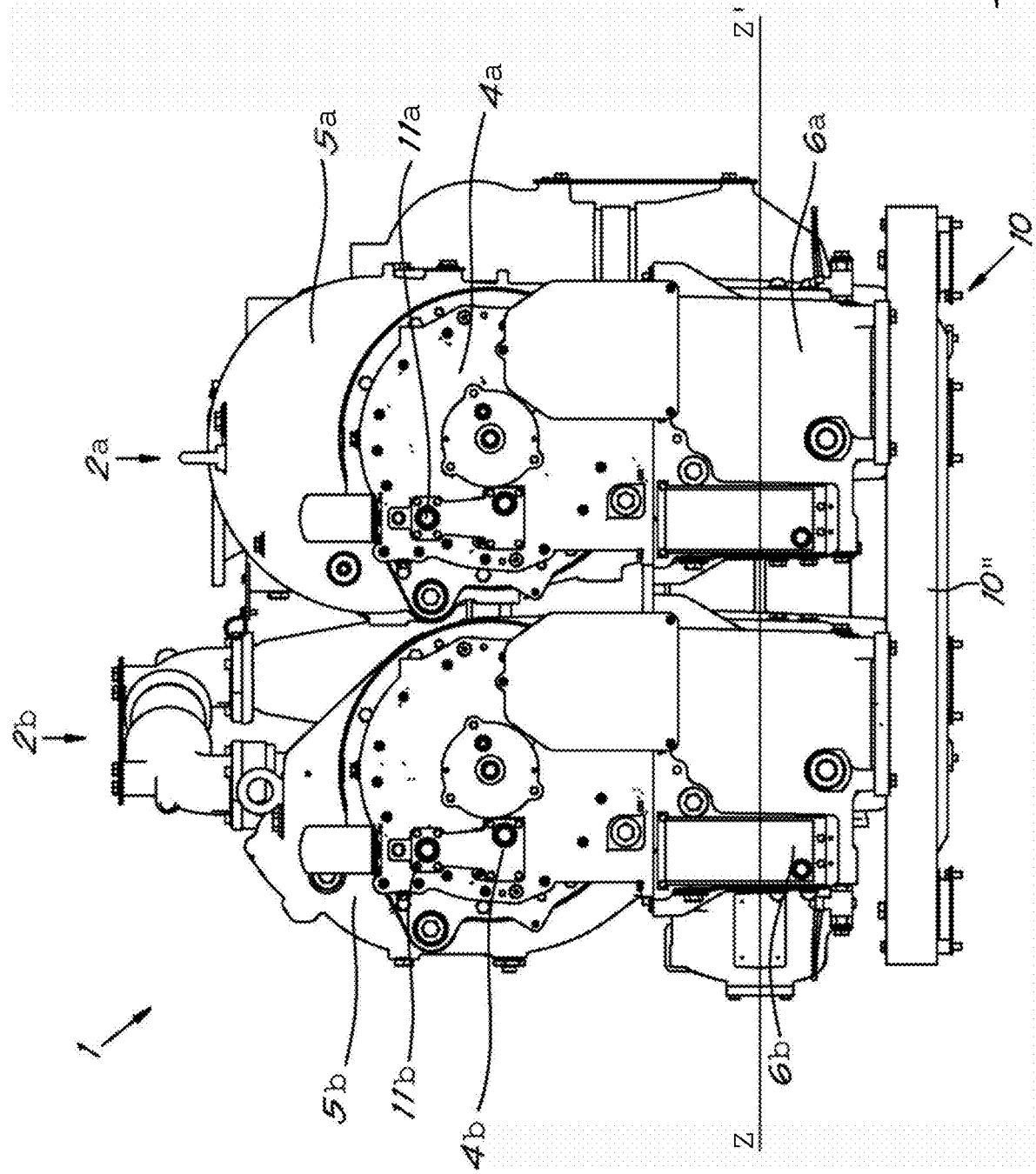
Figure 4:
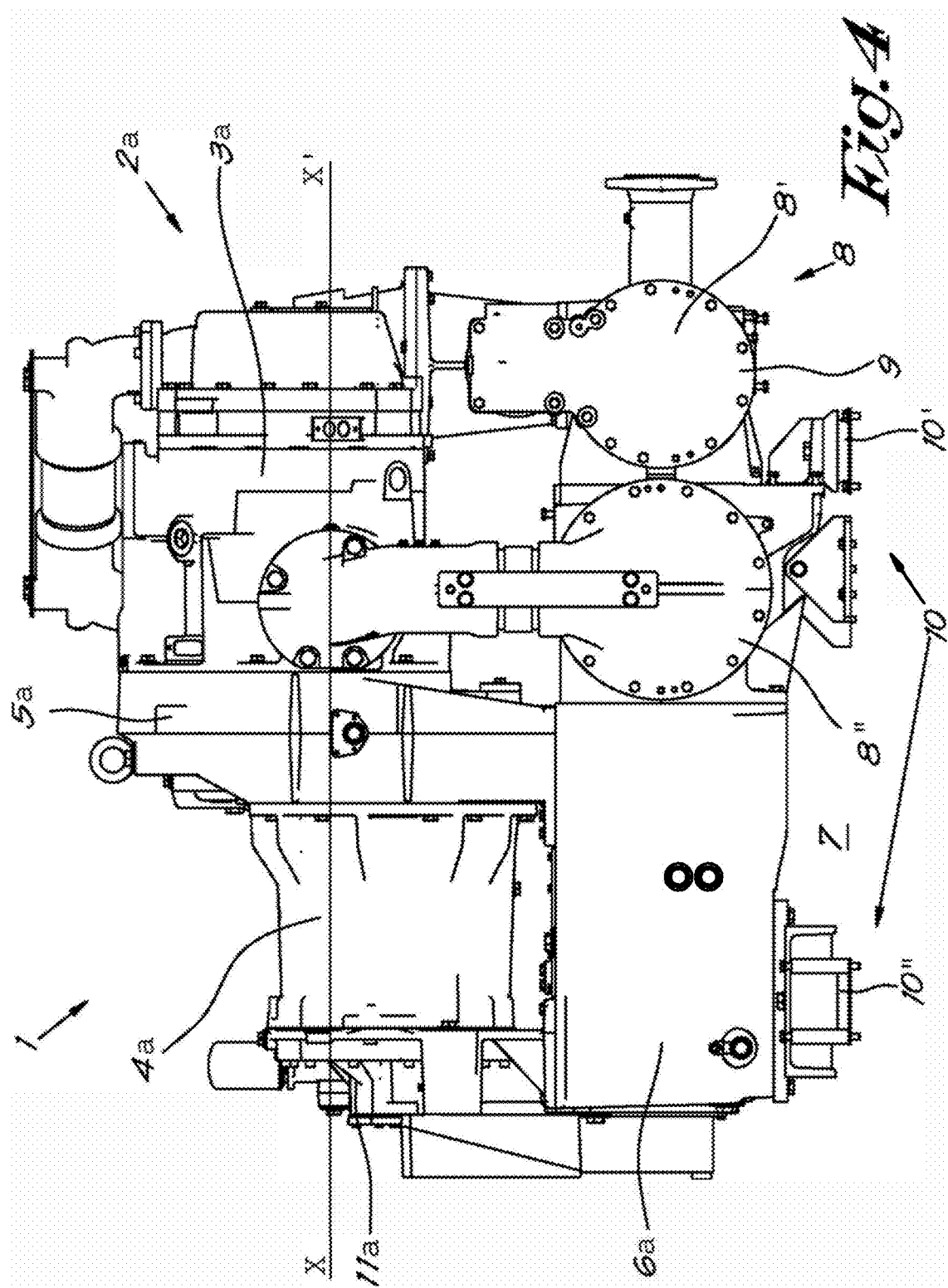

The device shown in FIGS. 1 to 4 is in this case a compressor device 1, more specifically a so-called two-stage compressor device 1 and, as is known, comprises a low-pressure stage 2a and a high-pressure stage 2b. Each stage 2a, 2b comprises a compressor element 3a, 3b, namely a low-pressure stage compressor element 3a and a high-pressure stage compressor element 3b, which are arranged in series.

It is also possible that both compressor elements are arranged in parallel. In this case one no longer speaks of low-pressure stage 2a and high-pressure stage 2b, but, for example, of "first" stage or "first" module and "second" stage or "second" module, of first compressor element 3a and second compressor element 3b, etc.

Said low-pressure stage 2a includes a low-pressure stage compressor element 3a. In this case, the low-pressure stage compressor element 3a is an oil-free compressor element.

According to the invention, this low-pressure stage compressor element 3a is driven by a separate drive, namely a low-pressure stage drive 4a.

The low-pressure stage compressor element 3a and the low-pressure stage drive 4a are arranged one behind the other as viewed in the axial direction X-X' of the low-pressure stage compressor element 3a.

In this case, but not necessarily for the invention, the low-pressure stage 2a is also provided with a transmission 5a.

The transmission 5a is arranged between the compressor element 3a and the drive 4a of the low-pressure stage 2a.

The high-pressure stage 2b is similarly constructed with a high-pressure stage compressor element 3b, which is also an oil-free compressor element and is driven by a separate drive, the high-pressure stage drive 4b.

The compressor element 3b and the drive 4b are also arranged one behind the other for the high-pressure stage 2b as viewed in the axial direction Y-Y' of the high-pressure stage compressor element 3b.

For example, both the low-pressure stage drive 4a and the high-pressure stage drive 4b are an electric motor.

It is obvious that both the low-pressure stage drive 4a and the high-pressure stage drive 4b can be different types of motors.

Furthermore, the high-pressure stage 2b is also provided with a transmission 5b, arranged between the drive 4b and the compressor element 3b of the high-pressure stage 2b.

This transmission 5b is different and separate from the transmission 5a of the low-pressure stage 2a.

However, it is also possible that one common transmission is provided.

The specific embodiment of the transmissions 5a, 5b can be realized in different ways. For instance, the transmissions 5a, 5b may simply comprise a gear set.

It is of course also possible that the transmissions 5a, 5b, as in the example shown, comprise a gearbox.

In the most preferred embodiment of the transmissions 5a, 5b, the gearbox comprises a housing and at least one driven gear mounted on a driven shaft and a drive gear mounted on a drive shaft, wherein the housing comprises two separate chambers, being a first chamber communicating with the driven shaft and a second chamber, wherein the first chamber is connected through a channel to the second chamber, wherein the second chamber is formed around the drive gear or driven gear, wherein the shape of the second chamber is such that upon rotation of the respective gear, a gas flow is created around this gear which, due to a venturi effect in the channel, causes an underpressure relative to a pressure in the second chamber.

The transmission ratio of these transmissions 5a, 5b is typically between two and six.

Each pressure stage 2a, 2b consequently has its own axis or line comprising a drive 4a, 4b, a gearbox 5a, 5b and a compressor element 3a, 3b. This own axis or line coincides with the above-mentioned axial direction X-X' or Y-Y', respectively.

According to the invention, and as can be seen in the Figures, the axial directions X-X' and Y-Y' of both compressor elements 3a, 3b extend parallel to and spaced apart from each other and such that the compressor elements 3a, 3b and the drives 4a, 4b are adjacent to each other.

Furthermore, the two-stage compressor device 1 also includes two oil reservoirs 6a, 6b, namely a low-pressure stage oil reservoir 6a and a high-pressure stage oil reservoir 6b.

According to the invention and as can be seen in the Figures, each oil reservoir 6a, 6b is located between its respective drive 4a, 4b and a base 7 when the two-stage compressor device 1 is arranged on this base 7.

The oil reservoirs 6a, 6b are located below the drives 4a, 4b and will, as it were, literally support the drives 4a, 4b.

In the example shown, the oil reservoirs 6a, 6b also support the transmissions 5a, 5b.

This location is advantageous, since the oil in the oil reservoir 6a resp. 6b will be used for the lubrication and/or cooling of the drive 4a resp. 4b, for the lubrication of the gears in the transmission 5a resp. 5b, and also for the lubrication of certain components of the compressor element 3a resp. 3b, like the bearings. If the compressor elements 3a, 3b are oil-injected, the oil from the oil reservoir 6a, 6b can also be used for injection into the compressor elements 3a, 3b.

Finally, the two-stage compressor device 1 also comprises a cooler 8, for cooling the compressed gas.

In this case, but not necessarily according to the invention, the cooler 8 comprises an intercooler 8' and an aftercooler 8", wherein the intercooler 8' will cool the compressed gas originating from the low-pressure stage compressor element 3a before it is sent to the high-pressure stage compressor element 3b, and the aftercooler 8" will cool the compressed gas originating from the high-pressure stage compressor element 3b.

In this case, both the intercooler 8' and the aftercooler 8" are a water-cooled air cooler.

In this case, the cooler 8 is provided with a composite housing 9, wherein the housing 9 of the intercooler 8' is attached to the housing 9 of the aftercooler 8', for example by bolts. It is not excluded that the cooler 8 is provided with one housing 9, in which both the intercooler 8' and the aftercooler 8" are arranged.

It is also possible that the intercooler 8' and the aftercooler 8" are air-cooled air coolers. In this case, the intercooler 8' will no longer serve as a cooler, but as a damper or silencer. In the housing 9 of the air-cooled cooler 8, a sound-damping mousse or foam can then be arranged, such that the housing 9 can serve as a sound damper or silencer, such that no separate silencer has to be provided. In this case, use can also be made of air-cooled coolers which are arranged outside the arrangement of the compressor device 1.

It is also possible that the aforementioned cooler 8 only comprises an intercooler 8'.

According to the invention, the aforementioned cooler 8, i.e. the intercooler 8' and the aftercooler 8", is located between, on the one hand, the compressor elements 3a, 3b and, on the other hand, the base 7.

The cooler 8 is located below the compressor elements 3a, 3b and supports in the arrangement one side of the oil reservoirs 6a, 6b. The compressor elements 3a, 3b are coupled with or suspended from the transmissions 5a, 5b which in turn rest on the oil reservoirs 6a, 6b.

The cooler 8 is located adjacent to the oil reservoirs 6a, 6b and will extend with its axial direction Z-Z' transverse to the axial directions X-X' and Y-Y' of the compressor elements 3a, 3b or with the corresponding own axis or line of each pressure stage 2a, 2b.

Due to this specific orientation of all components of the two-stage compressor device 1, a very compact machine is realized, in which the various components are nevertheless easily accessible for repair and maintenance.

In addition, in this embodiment a number of supports 10 are provided with which the two-stage compressor device 1 can rest on the base 7.

Firstly, the cooler 8, i.e. the aftercooler 8" and the intercooler 8', is provided with two supports 10'.

As can be seen in the Figures, the two-stage compressor device 1 is supported therewith on the base 7.

However, the number of supports 10' is not limiting for the invention. In other words, it is not excluded that the cooler 8 is provided with one or more than two supports 10'.

Also, the embodiment of these supports 10' can be realized in different ways.

Secondly, the oil reservoirs 6a, 6b are provided with one common support 10". Both oil reservoirs 6a, 6b are fixed or mounted on one support 10".

It is obvious that each oil reservoir 6a, 6b could also be provided with a separate support 10".

As already mentioned above, this specific arrangement ensures that the two-stage compressor device 1 is of a very compact design.

In addition, the low-pressure stage 2a and the high-pressure stage 2b are very modular and easily interchangeable, as each stage is provided with its own drive, transmission, oil reservoir and compressor element.

Finally, in the example shown, each oil reservoir 6a, 6b is provided with an oil pump 11a, 11b, namely a low-pressure oil pump 11a for the low-pressure oil reservoir 6a and a high-pressure oil pump 11b for the low-pressure oil reservoir 6b.

The oil pumps 11a, 11b will circulate the oil from the oil reservoirs 6a, 6b in the compressor device 1.

Each oil pump 11a, 11b is driven by its respective drive 4a, 4b, in other words, the low-pressure oil pump 11a is driven by the low-pressure drive 4a, and the high-pressure oil pump 11b is driven by the high-pressure drive 4b.

For this purpose, both oil pumps 11a, 11b are mounted on a shaft of the respective drive 4a, 4b.

The operation of the two-stage compressor device 1 is very simple and known.

The two-stage compressor device 1 will compress gas in two steps or stages. In the first stage, the low-pressure stage 2a, the gas is compressed a first time by the low-pressure stage compressor element 3a.

This gas will then be cooled in the intercooler 8', after which it will be passed to the second stage, the high-pressure stage 2b.

There, the high-pressure stage compressor element 3b will compress the gas for a second time.

The gas will then be cooled in the aftercooler 8" before it will leave the two-stage compressor device 1.

During operation, the drives 4a and 4b and the gearboxes 5a and 5b will be lubricated using the oil from the oil reservoirs 6a and 6b.

It is not excluded that the oil from the oil reservoirs 6a and 6b is also used for lubricating certain components of the compressor elements 3a, 3b, such for instance bearings.

Although in the example shown and described above the cooler 8 is located below the compressor elements 3a, 3b, and the oil reservoirs 6a, 6b below the drives 4a, 4b, it is not excluded that they are interchanged. This means that the cooler 8 supports the drives 4a, 4b.

Although in the example shown and described above, there are always two stages, it cannot be excluded that there are more than two stages. Indeed, the compressor device could also be provided with three pressure stages, with three compressor elements connected in series or parallel, and three associated oil reservoirs, drives, transmissions.

Although compressor elements are always mentioned in the example shown and described above, it cannot be excluded that the elements are blower elements or vacuum pump elements.

The present invention is by no means limited to the embodiments described by way of example and shown in the Figures, but a device and method according to the invention can be realized in all kinds of variants without departing from the scope of the invention.

The invention claimed is:

1. Device for compressing a gas, comprising a first element (3a) for compressing the gas and a second element (3b) for compressing the gas, wherein the device (1) is further provided with a drive (4a, 4b) for the elements (3a, 3b), a cooler (8) for the compressed gas and an oil reservoir (6a, 6b) for each of the elements (3a, 3b), namely a first oil reservoir (6a) for the first element (3a) and a second oil reservoir (6b) for the second element (3b), characterized in that a separate drive (4a, 4b) is provided for each element (3a, 3b), namely a first drive (4a) for the first element (3a) and a second drive (4b) for the second element (3b), wherein each element (3a, 3b) and the corresponding drive (4a, 4b), viewed in an axial direction (X-X',Y-Y') of this element (3a, 3b), are arranged one behind the other, wherein the axial directions (X-X', Y-Y') of both elements (3a, 3b) extend parallel to and spaced apart from each other and such that the elements (3a, 3b) and the drives (4a, 4b) are adjacent to one other, wherein, when the device (1) is arranged on a base (7):
 each oil reservoir (6a, 6b) is located between one or more of the drives (4a, 4b) or elements (3a, 3b), on the one hand, and the base (7), on the other hand; and
 said cooler (8) is located between one or more of the elements (3a, 3b) or drives (4a, 4b), on the one hand, and the base (7), on the other hand;
 wherein the cooler (8) is located adjacent to the oil reservoirs (6a, 6b) with respect to the base (7) and extends with its axial direction (Z-Z') transverse to the axial direction (X-X', Y-Y') of the elements (3a, 3b).

2. Device according to claim 1, characterized in that the first element (3a) and the second element (3b) are flowed through in parallel by the gas.

3. Device according to claim 1, characterized in that the first element (3a) and the second element (3b) are flowed through in series by the gas, wherein the first element (3a) a low-pressure stage element (3a) forms and the second element (3b) a high-pressure stage element (3b).

4. Device according to claim 3, characterized in that the cooler (8) comprises an intercooler (8') and an aftercooler (8").

5. Device according to claim 4, characterized in that the cooler (8) comprises a composite housing (9) wherein the housing of the intercooler (8') is attached to the housing of the aftercooler (8"), are installed in both the intercooler and (8') and the aftercooler (8").

6. Device according to claim 1, characterized in that between each element (3a, 3b) and each corresponding drive (4a, 4b), a separate transmission (5a, 5b) is arranged, namely a first transmission (5a) between the first element (3a) and the first drive (4a) and a second transmission (5b) between the second element (3b) and the second drive (4b).

7. Device according to claim 1, characterized in that one common transmission is arranged between the elements (3a, 3b) and the drives (4a, 4b).

8. Device according to claim 6, characterized in that the transmission or transmissions (5a, 5b) comprise a gear set.

9. Device according to claim 8, characterized in that the transmission or transmissions (5a, 5b) comprise a gearbox.

10. Device according to claim 9, characterized in that the gearbox comprises a housing and at least one driven gear mounted on the driven shaft and a drive gear mounted on a drive shaft, wherein the housing comprises two separate chambers, being a first chamber communicating with the driven shaft and a second chamber, wherein the first chamber is connected through a channel to the second chamber, wherein the second chamber is formed around the drive gear or driven gear, wherein the shape of the second chamber is such that upon rotation of the respective gear, a gas flow is created around this gear which, due to a venturi effect in the channel, causes an underpressure relative to a pressure in the second chamber.

11. Device according to claim 6, characterized in that a transmission ratio of the transmission (5a, 5b) is between two and six.

12. Device according to claim 1, characterized in that the cooler (8) is provided with one or more supports (10') with which the device (1) can rest on a base (7).

13. Device according to claim 1, characterized in that the oil reservoirs (6a, 6b) are provided with one common support (10") with which the device (1) can rest on a base (7).

14. Device according to claim 1, characterized in that the first element (3a) and the second element (3b) are oil-free elements.

15. Device according to claim 1, characterized in that the cooler (8) is a water-cooled air cooler.

16. Device according to claim 1, characterized in that each oil reservoir (6a, 6b) is provided with an oil pump (11a and 11b, respectively), wherein each oil pump (11a and 11b, respectively) is driven by the respective drive (4a and 4b, respectively).

17. Method of assembling a device for compressing a gas, which method comprises the following steps:
 providing a first element (3a) for compressing the gas and a second element (3b) for compressing the gas;
 providing a drive (4a, 4b) for the elements (3a, 3b);
 providing a cooler (8) for the compressed gas;
 providing an oil reservoir (6a, 6b) for each of the elements (3a, 3b), namely a first oil reservoir (6a) for the first element (3a) and a second oil reservoir (6b) for the second element (3b),
characterized in that the method further comprises the following steps:
 providing a separate drive (4a, 4b) for each element (3a, 3b), namely a first drive (4a) for the first element (3a) and a second drive (4b) for the second element (3b);
 placing each element (3a, 3b) and the corresponding drive (4a, 4b) one behind the other, viewed in an axial direction (X-X',Y-Y') of this element (3a, 3b), wherein the axial directions (X-X',Y-Y') of both elements (3a, 3b) extend parallel to and spaced apart from each other and such that the elements (3a, 3b) and the drives (4a, 4b) are adjacent to each other;
 placing the device (1) on a base (7), wherein each oil reservoir (6a, 6b) is arranged between one or more of the drives (4a, 4b) or elements (3a, 3b), on the one hand, and the base (7), on the other hand; wherein said cooler (8) is arranged between one or more of the elements (3a, 3b) or drives (4a, 4b), on the one hand, and the base (7), on the other hand; and wherein the cooler (8) is arranged adjacent to the oil reservoirs (6a, 6b) with respect to the base (7), wherein the cooler (8) extends with its axial direction (Z-Z') transverse to the axial direction (X-X', Y-Y') of the elements (3a, 3b).

* * * * *